United States Patent [19]

Fulcher et al.

[11] Patent Number: 5,465,707

[45] Date of Patent: Nov. 14, 1995

[54] SELF HEATING INDIVIDUAL MEAL PACKAGE

[76] Inventors: Fred Fulcher, 222 Central Ave. #313, Los Angeles, Calif. 90012; Andrew B. Huang, 28442 Lomo Dr., Rancho Palos Verdes, Calif. 92075

[21] Appl. No.: 260,323

[22] Filed: Jun. 15, 1994

[51] Int. Cl.⁶ ........................................ F24J 1/00
[52] U.S. Cl. .................. 126/263.08; 326/263.09; 326/263.08; 326/263.07; 326/263.06
[58] Field of Search ................. 126/262, 263 R, 126/263 D, 263 DA, 263 DB, 263 DC, 263 DD, 263.01, 263.05, 263.06, 263.07, 263.08, 263.09

[56] References Cited

U.S. PATENT DOCUMENTS

| | | | |
|---|---|---|---|
| 2,157,169 | 5/1939 | Foster | 126/263 R |
| 2,220,777 | 11/1940 | Othmer | 126/263 C |
| 2,935,983 | 5/1960 | Reik | 126/263 D |
| 4,771,761 | 9/1988 | Doukhan et al. | 126/263 DD |
| 4,867,131 | 9/1989 | van der Merwe et al. | 126/263 DD |
| 5,295,475 | 3/1994 | Kaneko | 126/263 R |

Primary Examiner—Larry Jones

[57] ABSTRACT

A self heating individual meal package includes a quantity of foodstuff to be heated. The package consists of a thermal insulated outer pouch. Within the package is an electrolytic-solvent activated exothermic-chemical pad or powder enclosed in an absorbent envelope, a bag containing electrolytic solvent and a pouch for foodstuff. The solvent bag is affixed to a board material which provides a rigid structure for the functioning of a tear filament pull-tab mechanism or the rupturing of the solvent bag. The pull-tab is affixed to the solvent bag so that when pulled the bag will open and the electrolytic solvent within can flow out to trigger the exothermic reaction.

29 Claims, 6 Drawing Sheets

SELF HEATING INDIVIDUAL MEAL PACKAGE

BACKGROUND—FIELD OF INVENTION

The present invention relates to a self heating individual meal contained in a flexible package using an exothermic reaction agent for heating a contained foodstuff.

BACKGROUND—DISCUSSION OF PRIOR ARTS

Self-heating meal modules of the type used, for example, by the military to heat food ration for an individual are well known.

One example of a self-heating meal module is described in U.S. Pat. No. 4,559,921, which was issued on Dec. 24, 1985 with inventor Benmussa. In this patent, there is disclosed a self-heating receptacle comprising a vessel for food to be heated, and below the vessel a sealed container containing two chemicals, e.g. quick lime and water. A pouch within the container holds one of the chemicals sealed from the other. A tearing filament secured to the pouch simultaneously opens the pouch and the container thereby to trigger the exothermic reaction to heat the said food vessel. The pouch is suspended by its ends above the bottom of the container and is surrounded by said other chemical. There is an outer housing in the bottom of which the container is disposed, the food vessel being disposed in the top of this housing. The container is hermetically sealed with a lid. The tearing filament extends across the lid below the bottom of the food vessel and emerges from between the housing and the food vessel in a portion that be grasped by the user to pull on the tearing filament thereby both to open the pouch and to tear the lid.

Other examples of self-heating meal are disclosed in the following Pickard et al. U.S. Pat. No. 5,220,909 which is issued Jun. 22, 1993; Semaan U.S. Pat. No. 4,823,769 issued Apr. 5, 1989; Okamoto et al. U.S. Pat. No. 4,819,612 issued Apr. 11, 1989; Charvin U.S. Pat. No. 4,809,673, which issued Mar. 7, 1989; Doukhan et al. U.S. Pat. No. 4,771,761 issued Sep. 20, 1988; Hamasaki U.S. Pat. No. 4,762,113 issued Aug. 9, 1988; Benmussa U.S. Pat. No. 4,510,919, which issued Apr. 16, 1985; Grosso et al. U.S. Pat. No. 3,871,357, which issued Mar. 18, 1975; and Douglas U.S. Pat. No. 3,653,372, which issued Apr. 4, 1972.

All of the above inventions comprises of a rigid outer container housing the foodstuff container and the chemical reagents. Furthermore, they all utilize the rigidity of the outer container for the operation of the trigger mechanism in ripping an enclosed solvent bag. The rigid outer containers present a number of problems in the manufacturing of the meal modules and their disposal.

Chemical thermal bags are also well known. Although they comprise of flexible outer housings, they do not have an enclosed foodstuff in a container or pouch. These chemical bags use the rupturing by squeezing of a rupturable solvent pouch for the initiation of the thermal reaction. Examples of chemical thermal bags are disclosed in the following Francis, Jr. U.S. Pat. No. 4,856,651, which issued Aug. 15, 1989; Taura U.S. Pat. No. 4,268,272, which issued May 19, 1981; Verakas U.S. Pat. No. 3,874,504, which issued Apr. 1, 1975.

None of the above references teaches the new and novel elements in the environment set forth hereinafter and defined as a self heating individual meal package. Neither do they provide the benefits and advantages associated therewith the following embodiments. As will become obvious from the figures and the detailed descriptions, the present invention has broad applications.

SUMMARY OF THE INVENTION

A self heating individual meal package of the present invention, uniquely constructed to include a quantity of food to be heated. The package consists of a thermal insulated outer pouch. Within the package is an electrolytic-solvent activated exothermic-chemical pad or powder enclosed within an absorbent envelope, a bag containing electrolytic solvent and a pouch for foodstuff. The solvent bag is affixed to a board material which provides a rigid structure for the proper functioning of a tear filament pull-tab mechanism or a means for rupturing the solvent bag. When the solvent bag is torn or ruptured, the electrolytic solution within can flow out to trigger the exothermic reaction in the reagent pack.

It is therefore, the primary objective of the present invention to provide a self heating individual meal package that can be inexpensively manufactured.

Another objective of the present invention is to provide a self heating individual meal package that is easily manufactured.

Still another objective of the present invention is to provide a self heating individual meal package which is less bulky.

Still another objective of the present invention is to provide a self heating individual meal package with less discarded packaging.

Other objectives of the present invention will become more apparent from the description and accompanying drawings.

REFERENCE NUMERALS IN DRAWING

Figure 1:
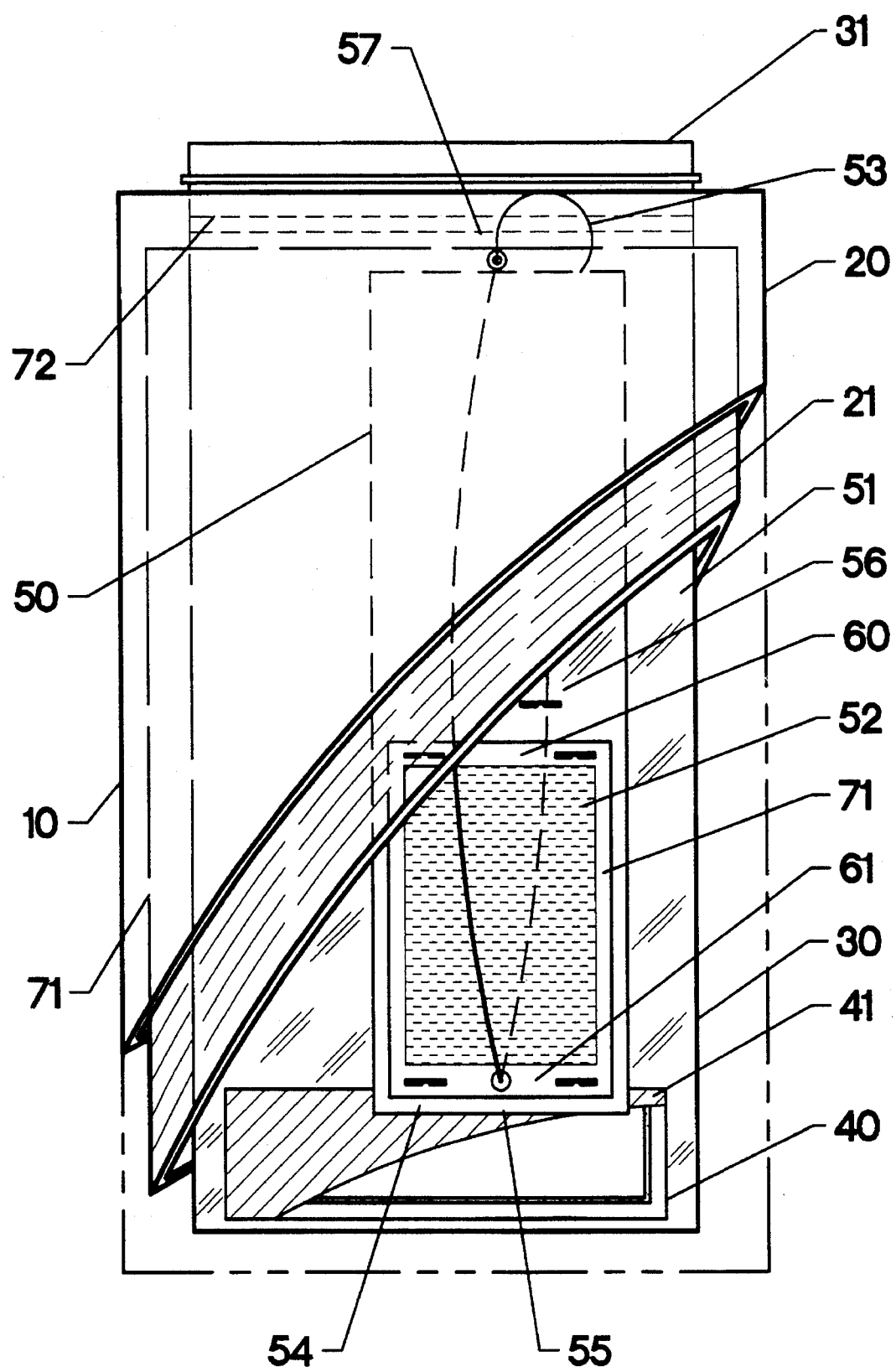
FIG. 1 is a perspective view, partly in section, of a self heating individual meal package showing the preferred embodiment of the present invention.

10—self heating individual meal package
20—outer pouch
21—thermal insulated layer
30—foodstuff pouch
31—plastic zipper
32—spout
33—cap
34—tear strip
40—exothermic pack 41—absorbent envelope
50—trigger mechanism
51—board
52—solvent bag
53—pull string
54—fasteners
55—rip hole
56—anchor
57—pull string hole
58—solvent escape holes
59—adhesive flap
60—upper lip
61—lower lip
71—weld seams
72—adhesive strips

DESCRIPTION OF INVENTION

In describing the preferred embodiments of the subsequent invention illustrated in the drawings, specific terminology will be used for the sake of clarity. It is understood that the invention is not intended to be limited to the specific terms so selected. It is further understood that each specific term includes all technical equivalents which operate in a similar manner to accomplish a similar purpose.

Figure 2:
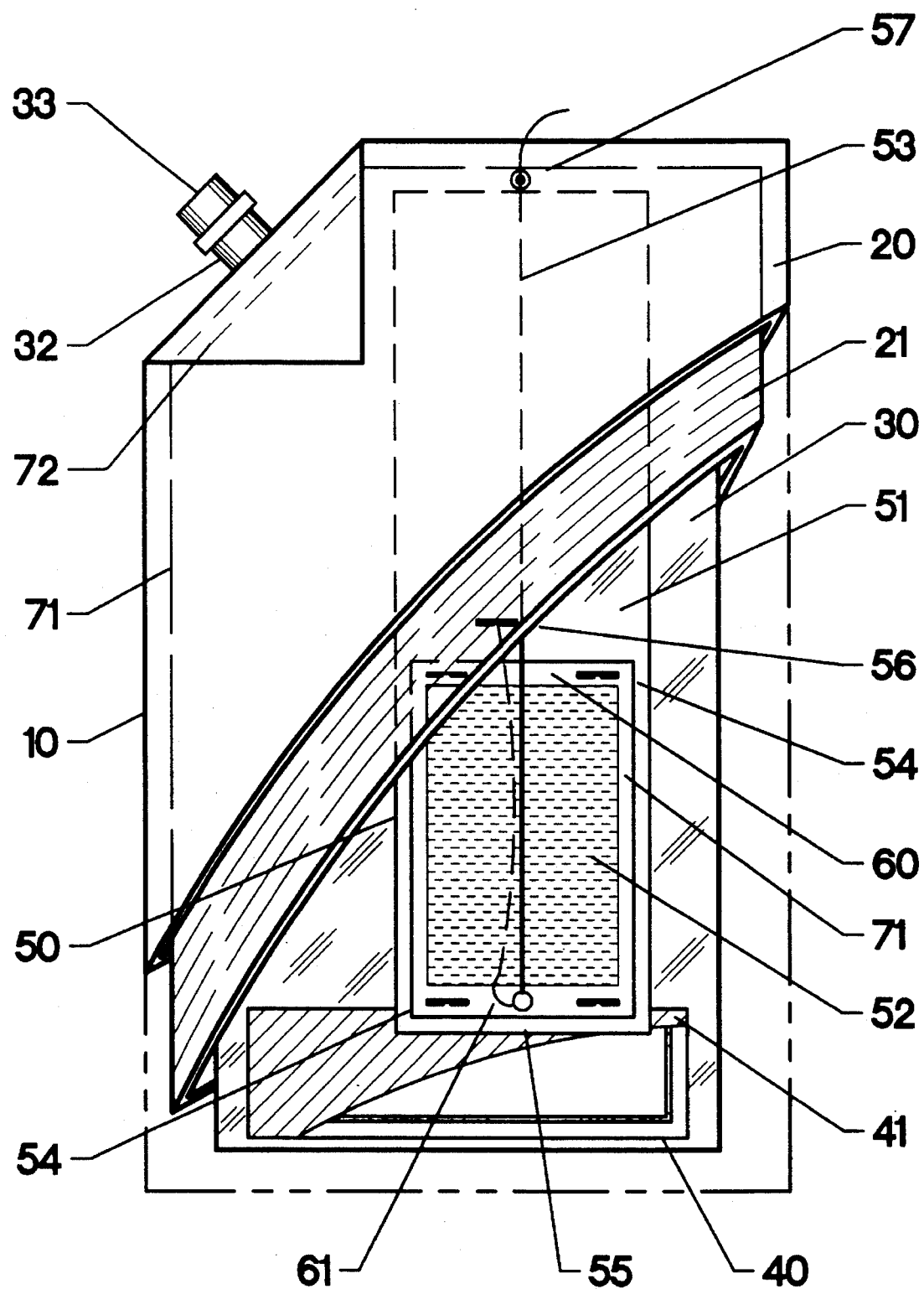
FIG. 2 is a perspective view, partly in section, of a self heating individual meal package showing another embodiment of the present invention.
Figure 3:
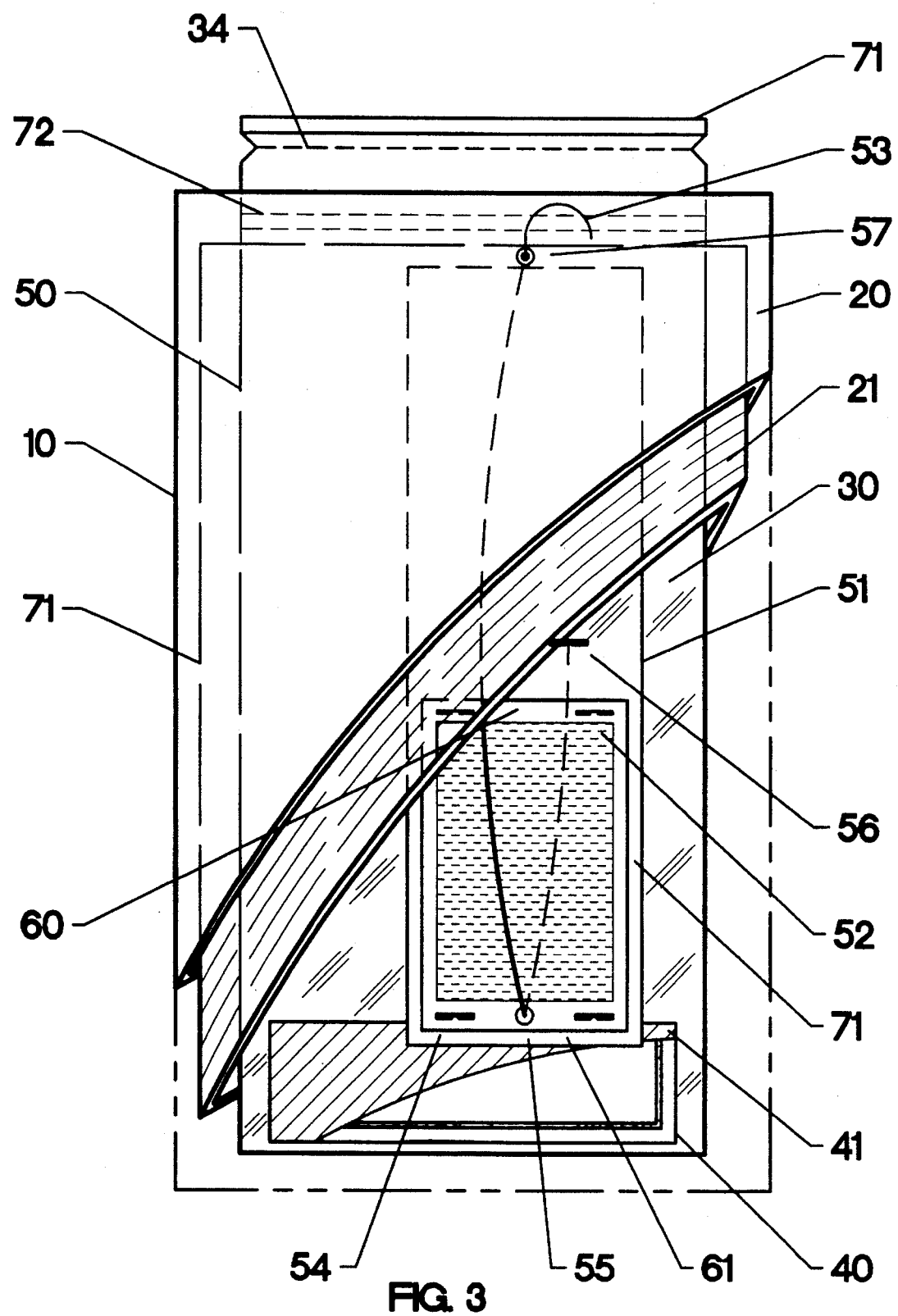
FIG. 3 is a perspective view, partly in section, of a self heating individual meal package showing still another embodiment of the present invention.

The present invention relates to a novel and improved self heating individual meal package. FIGS. 1-3 generally disclose the self heating individual meal package, in perspective, partly in section, according to the teaching of this invention. The self heating individual meal package 10 basically comprises a generally elongated outer pouch 20. Enclosed within the outer pouch 20 is the foodstuff pouch 30. Also in the space between the outer pouch 20 and the foodstuff pouch 30 are the exothermic pack 40 and a solvent bag 52 with a trigger mechanism 50. The solvent is released from the solvent bag 52 by means of the trigger mechanism 50.

Preferably, the outer pouch 20 is a flexible, liquid impermeable, laminated material or opaque laminated material such as biax nylon or mylar with a thermal insulated layer 21 on the inside. The thermal insulated layer 21 may be of a fine cell or cross-linked polyethylene or other suitable material. In the embodiment, the thermal insulated sheet 21 is made from a sheet of material trading under the name Jiffy Foam. The composite sheet material is folded together. The folded edge becomes the bottom of the outer pouch 20. Liquid-tight weld seams 71 are made around the sides to form the outer pouch 20.

Enclosed within the outer pouch 20 is the foodstuff pouch 30. The foodstuff pouch 30 is formed from a heat resistant, durable, liquid impermeable plastic sheet material folded together. The folded edge becomes the bottom of the foodstuff pouch 30. Liquid-tight weld seams 71 are made around the sides to complete the foodstuff pouch 30.

The preferred embodiment of the invention is shown in FIG. 1 in a perspective and sectional view. FIG. 1 shows all of the above mentioned elements. In particular, within the foodstuff pouch 30, a self-stable freeze-dried food is packaged. The foodstuff pouch 30 has an opening across the top edge through which water can be added to the foodstuff, and which can be sealed by a plastic zipper 31 during use of the device. Furthermore, the plastic zipper 31 of the foodstuff pouch 30 is located above the upper edge of the outer pouch 20, whereby this exposed portion of the foodstuff pouch 30 can be opened to release the heated foodstuff. Near the upper edge of the outer pouch 20, the inside surface of the outer pouch 20 is sealed against the outside surface of the foodstuff pouch 30 by weld seams 71 or by means of a two sided adhesive strips 72. The weld seams 71 or two sided adhesive strips 72 prevent cross contamination of the foodstuff with the enclosed chemicals when the foodstuff pouch 30 is opened. In addition, the weld seams 71 or adhesive strips 72 prevent heat loss during the exothermic reaction.

Another embodiment of the invention is shown in FIG. 2 in a perspective and sectional view. FIG. 2 shows all of the above mentioned elements. In particular, within the foodstuff pouch 30, a self-stable freeze-dried food is packaged. A spout 32 is affixed by liquid-tight weld seams 71 to the inside surfaces at the upper corner of the foodstuff pouch 30, permitting only an opening into the foodstuff pouch 30 through the opening of the spout 32. Water is poured into the foodstuff pouch 30 through the spout 32. A cap 33 seals the spout 32 during the use of the device. After the heating, the cap 33 is removed. Furthermore, the spout 32 is located significantly above the edge of the outer pouch 20, whereby allowing the heated foodstuff to pour out freely. Near the base of the spout 32, the outside surface of the foodstuff pouch 30 is sealed against the inside surface of the outer pouch 20 by weld seams 71 or by means of a two sided adhesive strips 72. The weld seams 71 or two sided adhesive strips 72 prevent cross contamination of the food with the enclosed chemicals when the cap 33 is removed. In-addition, the weld seams 71 or adhesive strips 72 prevent heat loss during the exothermic reaction.

Still another embodiment of the present invention is shown in FIG. 3 in a perspective and sectional view. FIG. 3 contains all of the above mentioned elements. In particular, within the foodstuff pouch 30, a self-stable ready-to-eat food is packaged. A liquid-tight weld seam 71 is formed across the top edge of the foodstuff pouch 30 which hermetically seals the foodstuff within. Furthermore, a sufficient portion of the foodstuff pouch 30 is located above the upper edge of the outer pouch 20, whereby this exposed portion of the foodstuff pouch 30 is torn along the tear strip 34 to release the heated foodstuff therein. Near the top edge of the outer pouch 20, the inside surface of pouch 20 is sealed against the outside surface of the foodstuff pouch 30 by weld seams 71 or by means of a two sided adhesive strips 72. The weld seams 71 or two sided adhesive strips 72 prevent cross contamination of the foodstuff with the enclosed chemicals when the foodstuff pouch 30 is torn opened. In-addition, the weld seams 71 or adhesive strips 72 prevent heat loss during the exothermic reaction.

Also shown in FIGS. 1-3, at the bottom of the outer pouch 20, in the space between the outer pouch 20 the foodstuff pouch 30 is the exothermic pack 40. The exothermic pack 40 consists of an exothermic pad or an exothermic reagent in powder form, and an absorbent envelope 41 which facilitates the exothermic reaction by absorbing the liquid solvent and bringing it in contact with the exothermic reagent within. Preferably, the absorbent envelope 41 is made from filter paper. When the exothermic reagent is an exothermic pad, the absorbent envelope 41 is a sheet of absorbent material wrapped around the exothermic pad. When the exothermic reagent is a powder, the exothermic powder is sealed within the absorbent envelope 41.

Figure 4:
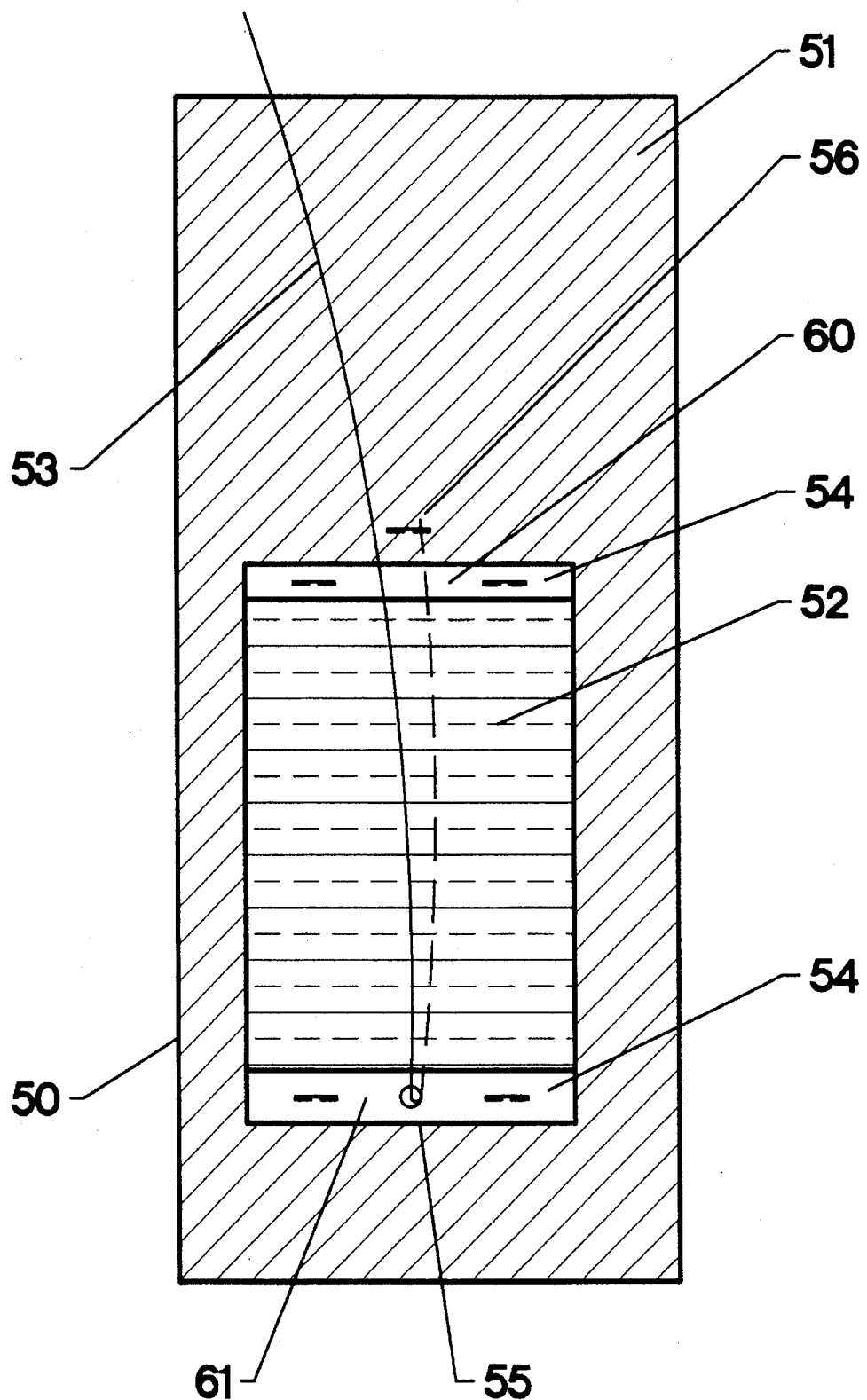
FIG. 4 is an enlarged, detailed view of one embodiment of the trigger mechanism taken along with FIG. 1, FIG. 2 or FIG. 3.
Figure 5:
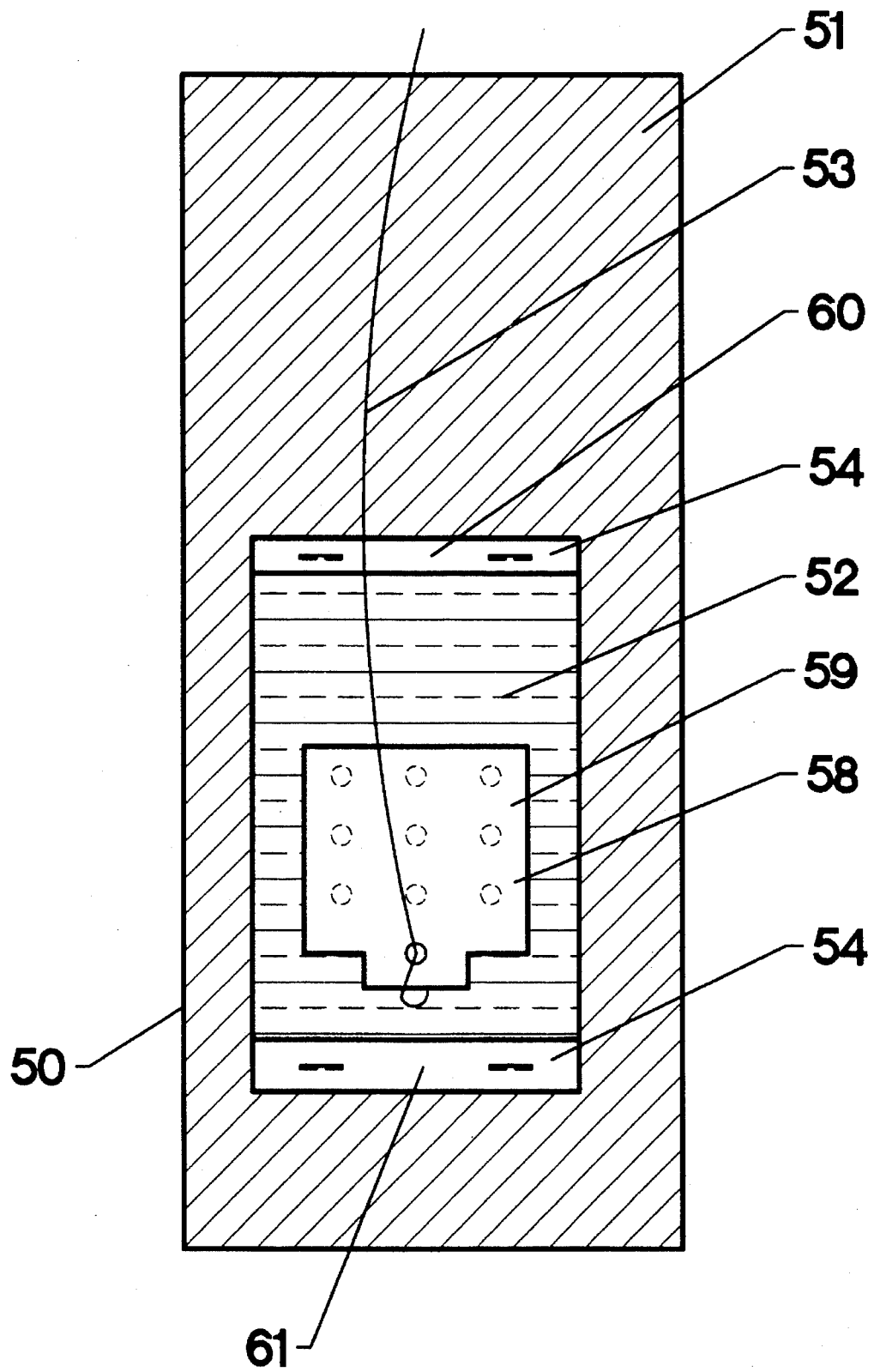
FIG. 5 is an enlarged, detailed view of another embodiment of the trigger mechanism which can be taken along with FIG. 1, FIG. 2 or FIG. 3.
Figure 6:
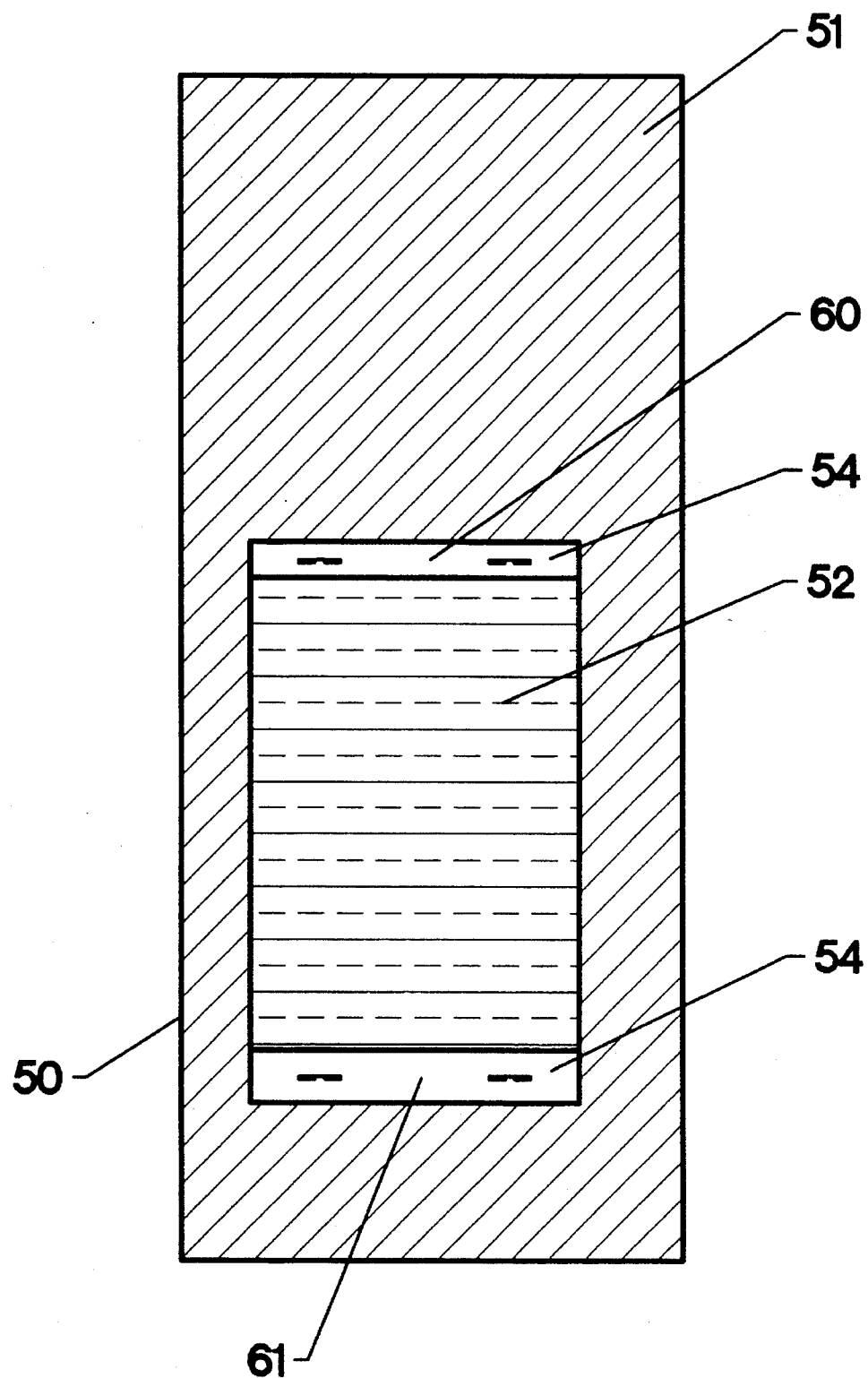
FIG. 6 is an enlarged, detailed view of still another embodiment of the trigger mechanism which can be taken along with FIG. 1, FIG. 2 or FIG. 3.

FIGS. 4-6 generally disclose enlarged detailed views of the trigger mechanisms as taught in the present invention. FIG. 4 shows the preferred trigger embodiment, and is clearly shown to be the trigger mechanism 50 of FIG. 1, FIG. 2 and FIG. 3. It is understood that the trigger embodiment shown in FIG. 5 and FIG. 6 can likewise be taught as the trigger mechanism 50 of FIG. 1, FIG. 2 and FIG. 3.

Shown in FIG. 4 is the preferred trigger mechanism 50. The solvent bag 52 is formed from a liquid impermeable plastic sheet material folded together. The folded edge forms the bottom of the solvent bag 52. Liquid-tight weld seams 71 are made around the sides to form the solvent bag 52. Two horizontal weld seams 71 are made across the top and bottom of the bag at a distance away from the edges to form an upper lip 60 and a lower lip 61. The solvent is contained within the volume enclosed by the side and horizontal weld seams 71. The upper lip 60 and the lower lip 61 are affixed by fasteners 54 to a board 51. The fasteners 54 secure the solvent bag 52 to the lower portion of the board 51 without rupturing the contained solvent. In the preferred trigger embodiment, the fasteners 54 are staples, other suitable devices can likewise be used. The board 51 is of significant length to occupy snugly in the space between the outer pouch 20 and the foodstuff pouch 30. The board 51 is of significant width as to provide adequate support for the attached solvent bag 52. In the preferred trigger embodiment, the board 51 is formed from cardboard. Other similarly stiff material may be used. The board 51 provides the structural strength for the functioning of the trigger mechanism 50. A pull string 53 enters into the self heating individual meal package 10 through the pull string hole 57. The pull string hole 57 is sufficiently small as to permit minimum heat loss during use. The pull sting 53 extends down the length of the board 51. At the upper lip 60, the pull sting loops under a fastener 54. The pull sting 53 further extends vertically down the length of the solvent bag 52. The pull sting 53 then threads through a rip hole 55 cut into the lower lip 61. The pull string 53 then traverses back up along the backside of the solvent bag 52 and is fastened to the board 51 by an anchor 56, at a location above the solvent bag 52. This looping of the pull sting 53 through the fastener 54, the rip hole 55 and the anchor 56, restricts and facilitates the tearing across the center of the solvent bag 56 when the pull string 53 is pulled.

Shown in FIG. 5 is another trigger mechanism 50. The board 51 in all aspects of property, construction and function are as described previously. The solvent bag 52 property and function are the same as described above. However, the solvent bag 52 is formed with solvent escape holes 58 on the front face of the solvent bag 52. An adhesive flap 59 covers a significant portion of the escape holes 58 as to allow the retention of the solvent within the solvent bag 52. A pull string 53 enters the self heating individual meal package 10 through the pull string hole 57. The pull string hole 57 is sufficiently small as to permit minimum heat loss during use of the device. The pull sting 53 extends down the length of the board 51. At the upper lip 60, the pull sting 53 loops under a fastener 54. The pull sting 53 traverses vertically down the length of the solvent bag 52 and is fasten to the adhesive flap 59. Upon pulling the pull string 53, the adhesive flap 59 peels off and releases the solvent.

Shown in FIG. 6 is still another trigger mechanism 50. The board 51 in all aspects of property and construction are as described previously. The solvent bag 52 in function is the same as described above. However, the solvent bag 52 is formed from a liquid impermeable rupturable plastic sheet material. The solvent bag 52 is affixed to the lower portion of the board 51. The board 51 provides a stiff structure whereby the solvent bag 52 can be pressed against and ruptured.

Having described our invention, we claim:

1. A self-heating individual meal package comprising:
    (a) an outer pouch formed from a folded sheet of flexible, liquid impermeable, laminated material with a thermal insulated layer and liquid-tight seams;
    (b) a foodstuff pouch formed from a folded heat resistant, durable, liquid impermeable plastic sheet material with liquid-tight seams, said foodstuff pouch enclosed within much of said outer pouch;
    (c) an exothermic pack enclosed in the bottom of the space between said outer pouch and said foodstuff pouch, said exothermic pack contains an exothermic reagent activated by a solvent;
    (d) a solvent bag, said solvent bag affixed to a trigger mechanism means, where said trigger mechanism means includes a pull tab means, said trigger mechanism means dimensioned to fit within said meal package space, said solvent bag and said trigger mechanism means enclosed in said space between said outer thermal insulated pouch and said foodstuff pouch,
    (e) said trigger mechanism means including a rigid member and a pull-tab means connected to said rigid member and said solvent bag for tearing said solvent bag with said rigid member acting as a guide and support member for the pull-tab means, said solvent bag tearing and the escaping solvent contacting said exothermic pack and thereby initiating an exothermic reaction to heat the enclosed foodstuff.

2. The self heating individual meal package according to claim 1, wherein said trigger mechanism means comprising;
    (a) a board having significant dimensions to fit snugly within said space; said board formed from a stiff board material;
    (b) a pull sting having one end anchored to said board, looping the center of and across the length of said solvent bag, exiting out through a hole in said outer pouch, whereby upon pulling said pull string, said solvent bag tears and releases said solvent.

3. The self heating individual meal package according to claim 1, wherein said trigger mechanism means comprising;
    (a) a board having significant dimensions to fit snugly within said space; said board formed from a stiff board material;
    (b) a pull sting having one end affixed to an adhesive pad, said adhesive pad covers perforation holes on said solvent bag, the other end of said pull string extends out through a hole in said outer pouch, whereby upon pulling said pull string, said adhesives pad peels off releasing said solvent.

4. The self heating individual meal package according to claim 1, wherein said trigger mechanism means comprising;
    (a) a board having significant dimensions to fit snugly within said space; said board formed from a stiff board material;
    (b) said solvent bag form from liquid impermeable, rupturable sheet material, said solvent bag affixed to said board, whereby said solvent bag ruptures when pressed against said board.

5. The self heating individual meal package according to claim 2, wherein said exothermic pack comprises;
    (a) an exothermic pad;
    (b) an absorbent envelope, said absorbent envelope is a sheet of absorbent material wrapped around said exothermic pad.

6. The self heating individual meal package according to claim 2, wherein said exothermic pack comprises;
    (a) an exothermic powder;
    (b) an absorbent envelope, said exothermic powder is sealed within said absorbent envelope.

7. The self heating individual meal package according to claim 3, wherein said exothermic pack comprises;
(a) an exothermic pad;
(b) an absorbent envelope, said absorbent envelope is a sheet of absorbent material wrapped around said exothermic pad.

8. The self heating individual meal package according to claim 3, wherein said exothermic pack comprises;
(a) an exothermic powder;
(b) an absorbent envelope, said exothermic powder is sealed within said absorbent envelope.

9. The self heating individual meal package according to claim 4, wherein said exothermic pack comprises;
(a) an exothermic pad;
(b) an absorbent envelope, said absorbent envelope is a sheet of absorbent material wrapped around said exothermic pad.

10. The self heating individual meal package according to claim 4, wherein said exothermic pack comprises;
(a) an exothermic powder;
(b) an absorbent envelope, said exothermic powder is sealed within said absorbent envelope.

11. The self heating individual meal package according to claim 5, wherein said foodstuff pouch has a plastic zipper.

12. The self heating individual meal package according to claim 5, wherein said foodstuff pouch has a spout and cap.

13. The self heating individual meal package according to claim 5, wherein said foodstuff pouch is sealed.

14. The self heating individual meal package according to claim 6, wherein said foodstuff pouch has a plastic zipper.

15. The self heating individual meal package according to claim 6, wherein said foodstuff pouch has a spout and cap.

16. The self heating individual meal package according to claim 6, wherein said foodstuff pouch is sealed.

17. The self heating individual meal package according to claim 7, wherein said foodstuff pouch has a plastic zipper.

18. The self heating individual meal package according to claim 7, wherein said foodstuff pouch has a spout and cap.

19. The self heating individual meal package according to claim 7, wherein said foodstuff pouch is sealed.

20. The self heating individual meal package according to claim 8, wherein said foodstuff pouch has a plastic zipper.

21. The self heating individual meal package according to claim 8, wherein said foodstuff pouch has a spout and cap.

22. The self heating individual meal package according to claim 8, wherein said foodstuff pouch is sealed.

23. The self heating individual meal package according to claim 9, wherein said foodstuff pouch has a plastic zipper.

24. The self heating individual meal package according to claim 9, wherein said foodstuff pouch has a spout and cap.

25. The self heating individual meal package according to claim 9, wherein said foodstuff pouch is sealed.

26. The self heating individual meal package according to claim 10, wherein said foodstuff pouch has a plastic zipper.

27. The self heating individual meal package according to claim 10, wherein said foodstuff pouch has a spout and cap.

28. The self heating individual meal package according to claim 10, wherein said foodstuff pouch is sealed.

29. A self heating individual meal package comprising:
(a) an outer pouch formed from a folded sheet of flexible, liquid impermeable, laminated material with a thermal insulated layer and liquid-tight seams;
(b) a foodstuff pouch formed form a folded heat resistant, durable, liquid impermeable plastic sheet material with liquid-tight seams, said foodstuff pouch enclosed within much of said outer pouch;
(c) an exothermic pack enclosed in the bottom of the space between said outer pouch and said foodstuff pouch, said exothermic pack contains an exothermic reagent activated by a solvent;
(d) a solvent bag, said solvent bag affixed to a trigger mechanism means where said trigger mechanism means includes a rigid means dimensioned to fit within said mean package space, said solvent bag and said trigger mechanism means enclosed in said space between said outer thermal insulated pouch and said foodstuff pouch,
(e) said trigger mechanism means including a rigid means for rupturing said solvent bag when pressed, the escaping solvent contacting said exothermic pack and thereby initiating an exothermic reaction to heat the enclosed foodstuff.

* * * * *